United States Patent [19]

Lanius et al.

[11] 4,413,804

[45] Nov. 8, 1983

[54] PISTON VALVE AND FUEL TANK ASSEMBLY

[75] Inventors: Charles A. Lanius, Prairie du Sac; Harold D. Hulterstrum; Gerald A. Rau, both of Baraboo, all of Wis.

[73] Assignee: Flambeau Product Corporation, Baraboo, Wis.

[21] Appl. No.: 283,570

[22] Filed: Jul. 15, 1981

[51] Int. Cl.[3] .............................................. F16K 51/00

[52] U.S. Cl. .................................... 251/144; 251/284; 251/324

[58] Field of Search ................ 251/319, 324, 284, 144

[56] References Cited

U.S. PATENT DOCUMENTS

| | | | |
|---|---|---|---|
| 2,798,690 | 7/1957 | Nelson et al. | 251/284 |
| 3,370,827 | 2/1968 | Stehlin | 251/144 |
| 3,434,694 | 3/1969 | Skinner | 251/324 |
| 3,563,508 | 2/1971 | Delorenzo | 251/324 |
| 4,203,461 | 5/1980 | Schwitters | 251/324 |

*Primary Examiner*—A. Michael Chambers

*Attorney, Agent, or Firm*—Allegretti, Newitt, Witcoff & McAndrews, Ltd.

[57] ABSTRACT

A piston valve comprising a housing and a piston slidably engaged therein. The valve is especially adapted to be molded of plastic for use in fuel lines of lawn mowers and other small gasoline-powered engines. Also, a combination fuel tank and piston valve assembly.

14 Claims, 6 Drawing Figures

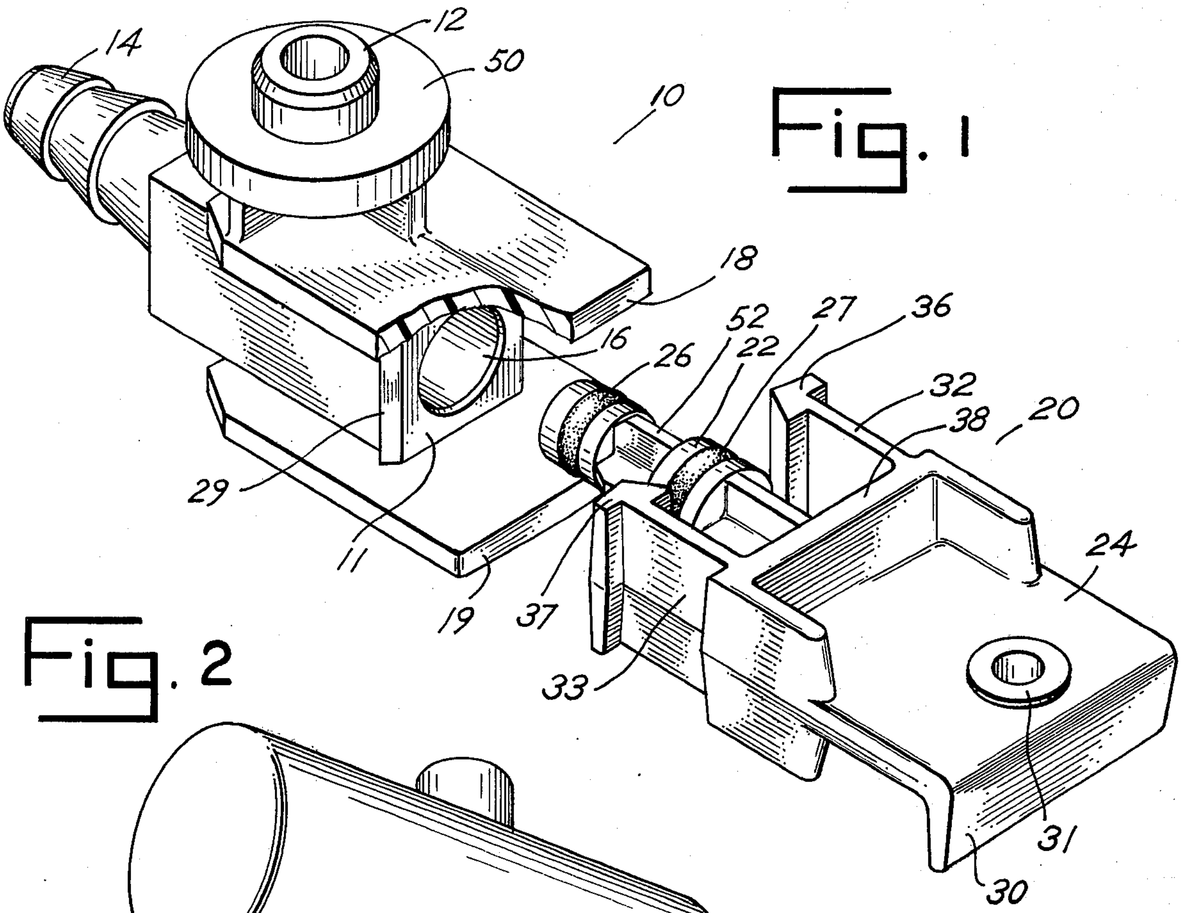
Fig. 1
Fig. 2
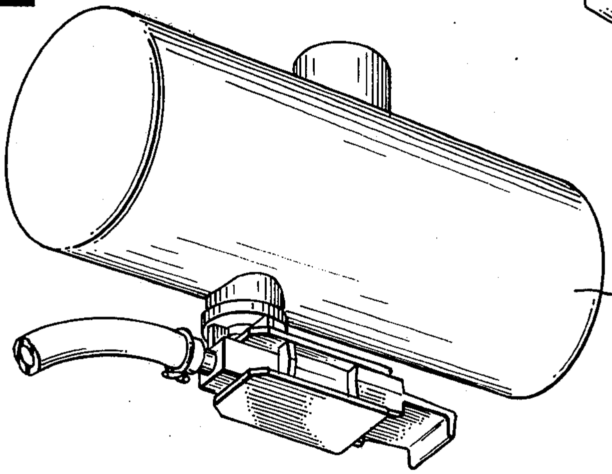
Fig. 3
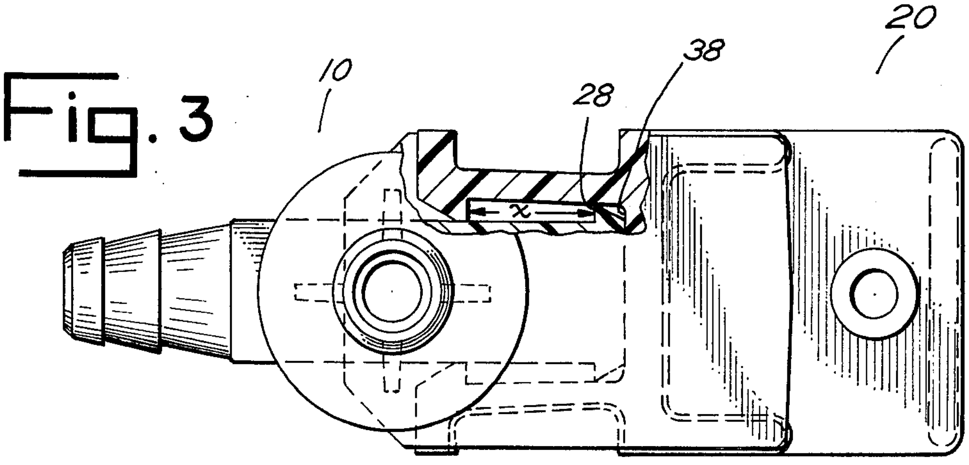

PISTON VALVE AND FUEL TANK ASSEMBLY

BACKGROUND OF THE INVENTION

This invention relates to a valve and, more particularly, to a piston valve for fuel or other liquid fitting uses where on-off valves are required. This invention also relates to a combination fuel tank and piston valve assembly.

The presently known valves are generally of the plug cock, ball cock, butterfly, or gate valve types. Small valves for regulating the control of fluid, such as is required in the fuel line of a gasoline-powered lawn mower, for example, generally are of one of the above types. Control of the flow of fluid, such as the fuel, is by means of a movable element that opens, shuts, or partially obstructs an opening in a passageway or channel. A plug cock valve is a simple device in which the fluid passage is a hole in a rotatable plug which has a slightly tapered shape and is fitted in the body of the cock. A ball cock valve permits fluid passage through a hole in a ball rotatably mounted in the fluid channel. A 90 degree rotation of the ball changes the valve from fully open to fully blocked. A butterfly valve contains a circular disc pivoted along one diameter. In the fully opened position the disc is parallel to the direction of flow. In the fully closed position the plane of the disc is perpendicular to the direction of flow. In a gate valve a wedge-shaped gate, actuated by a stem (typically with a screw thread) and a hand wheel moves up and down. The gate bears against two seat faces to shut off the flow of fluid. Valves of the above types, because of the close tolerances normally required, typically are made of metal. Furthermore, none of these valves is operated by a simple push-pull movement, which is highly desirable in applications in which a choke-wire type pull could be used to advantage, such as in a lawn mower or weed trimmer.

Increasingly, small gasoline-powered appliances, such as lawn mowers, weed trimmers, outboard motors, and the like, are provided with fuel tanks molded of plastic because of the durability, light weight, relative ease of manufacture, and low cost of a molded plastic fuel tank. Shut-off valves for such fuel tanks usually are secured to the tank through the use of threaded fittings. A common problem with such devices is leakage at the interface of the metal and the plastic threads. Such leakage is a result of the inherent unreliability of the seal which is formed when metal is threaded into plastic. Where the fluid is a highly flammable fuel, such as gasoline or other fuel, even a minimal amount of leakage can present a substantial safety hazard to the user. It is old in the art to use a metal shut-off valve having a plastic fitting to be threaded into the fuel tank in an attempt to minimize the problem of leakage. Incorporation of such a fitting on a valve as a safety feature, however, increases the difficulty and cost of manufacture of the valve.

The present invention relates to an improved valve which is characterized by simplicity of construction, economy of manufacture, ease of operation and repair, and enhanced ability to be effectively sealed to a fuel tank. The present invention also relates to a fuel tank which can be sold as having a valve integrally bonded thereto.

SUMMARY OF THE INVENTION

Briefly, the present invention comprises a valve having a housing with a fluid channel and a piston serving as a valve member in the channel. The valve is operated by a push-pull action to effect opening and closing. In the fully open position, the shaft of the piston, slidably engaged within the housing, is fully retracted into the piston channel and does not block the flow channel, allowing fluid to enter the intake port, flow through the flow channel, and exit through the exhaust port. Sealing means provides a seal between the shaft and the piston channel to keep fluid from leaking out of the valve through the opening in the housing, through which the piston extends. In the fully closed position the piston is slid further into the housing so that a portion of the shaft extends through the flow channel into proximity with the exhaust channel. Flow channel sealing means, typically mounted on the shaft, provides a seal between the shaft and the flow channel, blocking the flow of the fluid. Piston channel sealing means continues to provide a seal between the shaft and the piston channel.

Because of the simplicity of operation and construction, the valve, and particularly, the housing, is adaptable to be molded of plastic. As a result, a superior seal can be maintained between a plastic fuel tank and the valve even when they are connected by being threaded into one another. An even more effective seal is possible when the valve is heat sealed to the fuel tank.

Thus, it is an object of the present invention to provide an improved piston valve.

It is another object of the present invention to provide an inexpensive on-off valve which can be operated either by hand or by a choke-wire type pull.

A further object of the present invention is to provide a piston valve of molded plastic that is adapted for use with plastic tanks and containers by being heat sealed and integrally bonded thereto or by being threaded thereto.

It is a still further object of the present invention to provide a piston valve which can be easily and inexpensively repaired.

These and other objects, advantages, and features of the present invention will be set forth in the detailed description which follows.

BRIEF DESCRIPTION OF THE DRAWING

A preferred embodiment of the present invention will be described, in detail, with reference ot the drawing wherein:

FIG. 1 is an exploded perspective view of the housing and piston;

FIG. 2 is a bottom perspective view of the valve as attached to or bonded integral with a fuel tank, with a fuel line attached to the exhaust port of the valve;

FIG. 3 is a top plan view, partly in section, of the valve assembly in the fully closed position;

DESCRIPTION OF THE PREFERRED EMBODIMENT

Figure 4:
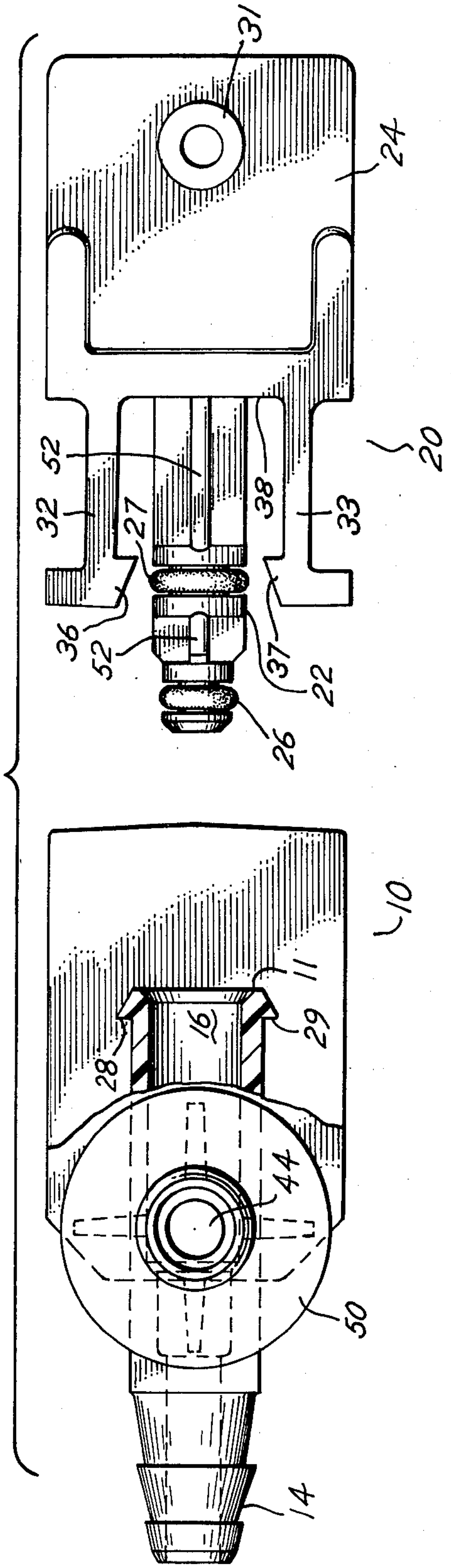
FIG. 4 is a top exploded view of the housing and piston.
Figure 6:
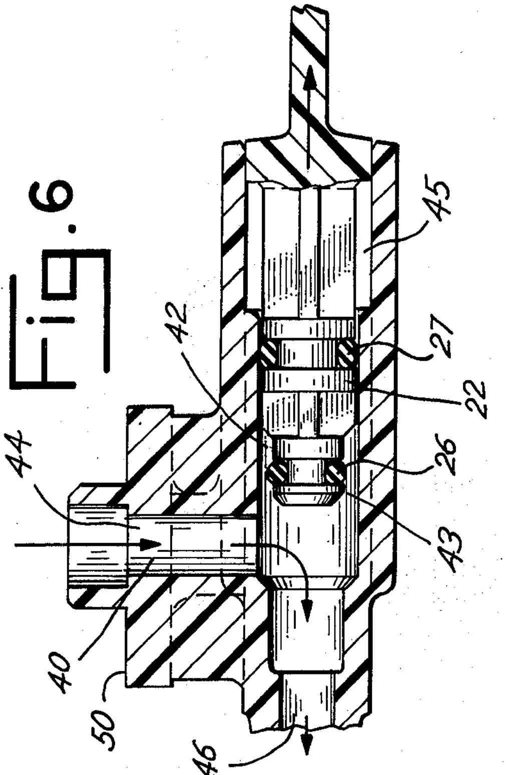
FIG. 6 is a partial side cross-sectional view similar to FIG. 5 but showing the position of the shaft when the valve is in the fully open position.

Referring to the drawings, the improved valve of the present invention includes a housing 10 and a slidable flow control piston 20. The housing 10 has an intake port 12 and an exhaust port 14, through which the fluid to be regulated enters and exists respectively. A flow channel 40, as best shown in FIG. 6, connects the intake port 12 to the exhaust port 14. The flow channel 40 includes an intake channel 44 and an exhaust channel 46. The housing is particularly adaptable to be molded of plastic. In the preferred embodiment depicted in the drawings, the intake channel 44 and exhaust channel 46 define a right angle in the housing 10. Other embodiments of the present invention include configurations in which the flow channel 40 may define a straight passage through the housing 10, as well as other configurations. The flow channel 40 is generally cylindrically shaped. Also defined within the housing 10 is a generally cylindrically shaped piston channel 42 having a first end 43 adjacent to and in fluid communication with the flow passageway 40 and a second end 45 defining an opening 16 in the rear face 11 of the housing 10.

Figure 5:
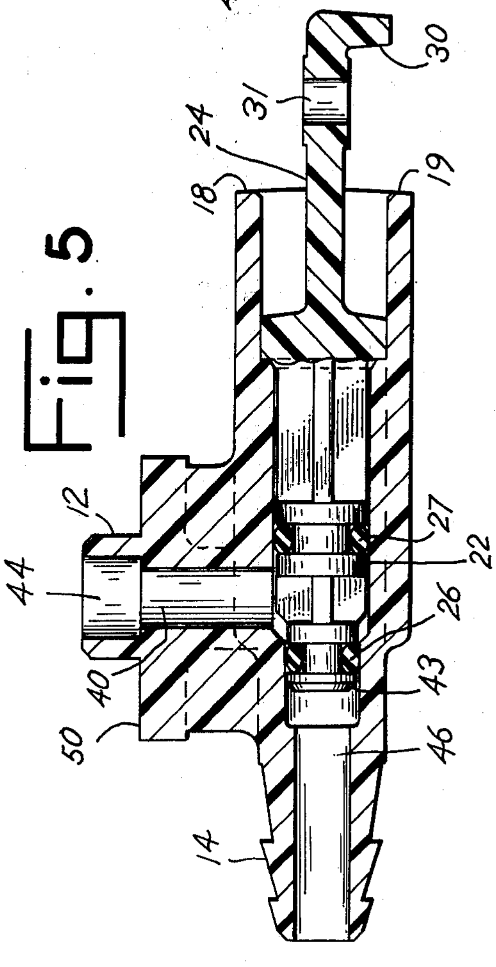
FIG. 5 is a partial side cross-sectional view of the valve in the fully closed position, showing the shaft of the piston fully.

Piston 20 has a shaft 22 and a butt 24. Piston 20 acts as the closure member and is slidably engaged within the housing 10. Mounted on the shaft 22 are flow channel sealing means 26 and piston channel sealing means 27, both of which preferably are O-rings, such as are typically made of rubber as other elastomeric materials. When the valve is in the fully open position, the shaft 22 is substantially retracted within the piston channel 42, as best shown in FIG. 6, allowing relatively unimpeded flow within the flow channel 40. The arrows in FIG. 6 show the directional flow of the fluid to be regulated through the valve. In this position, piston channel sealing means 27 are in sealing engagement with the piston channel 42 and the shaft 22, thus preventing escape of fluid through the piston channel 42 and the opening 16. When the valve is in the fully closed position, as best shown in FIG. 5, piston 20 is slid further into the housing 10 so that the shaft 22 extends through the piston channel 42 and into the flow channel 40. In this position, the flow channel sealing means 26 is in sealing engagement with the flow channel 40 and the shaft 22, thus halting the flow of fluid through the flow channel 40 and out of the valve through the exhaust port 14. When the piston 20 has been fully slid into the housing 10, the piston channel sealing means 27 remains within the piston channel 42, thus maintaining an effective seal between the shaft 22 and the piston channel 42, preventing escape of the fluid through the piston channel 42 and the opening 16. The piston is adaptable to be molded in one piece of plastic, although the shaft could also be made of metal or other suitable material. In the embodiment shown, shaft 22 has been molded with axially aligned ribs 52 to enhance the structural strength of said shaft 22, to minimize the difficulty and expense of manufacture, and to reduce frictional resistance.

As depicted best in FIGS. 5 and 6, the piston passageway 42 is in axial alignment with the portion of the flow passageway 40 adjacent to the exhaust port 14. Thus, the shaft 22 can be moved between the closed and the open positions by pushing and pulling respectively on the butt 24 of the piston 20. To facilitate movement, the butt 24 extends beyond the housing 10 through the opening 16. Manual operation of the valve is facilitated through use of the grip 30. A choke-wire type pull can be easily attached to the fastening hole 31.

In the preferred embodiment of the present invention, the inward travel of the piston relative to the housing is halted when the rear face 11 of the housing 10 engages the bedplate 38 of the piston 20, as best shown in FIG. 3. The length of the shaft 22 and the position of the piston channel sealing means 27 are such that when the piston 20 is fully slid into the housing 10, the piston channel sealing means 27 continues to be in sealing engagement with the piston channel 42 and the shaft 22. As can be readily appreciated, there must be a correlation between the travel of the piston 20 relative to the housing 10 from the fully closed to the fully open position, represented by the distance x as shown in FIG. 3, and the length of the shaft 22 and the position of the piston channel sealing means 27 mounted thereon, such that the piston channel 42 is sealed at all times.

To keep dirt, dust, and other particulate from contaminating the interior of the housing 10 through the opening 16, the housing 10 is provided with shields 18 and 19 and the piston 20 is provided with arms 32 and 33. When the valve is in the fully open position, the shields, 18 and 19 and arms 32 and 33 cooperate to completely surround the opening 16 and the shaft 22, protecting them from contamination. When the valve is in the off possition the butt 24 comes in to contact with the housing 10 adjacent the opening 16, thus preventing contamination.

To retard outward movement of the piston 20 when the valve is being pulled or retracted to the open position, piston 20 is provided with latches 36 and 37 mounted on arms 32 and 33. As the piston 20 is being retracted from the housing 10, retaining stops 28 and 29, formed in the housing 10 adjacent to the rear face 11 engage latches 36 and 37, preventing further movement.

To facilitate attachment of the valve to plastic tanks and containers, which are increasingly being used in small engine appliances because of their durability, light weight, relative ease of manufacture, and low cost, the preferred embodiment of the present invention includes a mounting platform 50 on the housing 10 which can be heat sealed to a plastic tank or container, whereby an integral unit is formed thereby. The ability to bond a fuel tank and a valve housing together, forming an integral unit, eliminating altogether the need for subsequent sealing of the valve to the tank, is an important commercial result of the present invention. Such a combination, shown in FIG. 2, not only significantly reduces manufacturing costs, but improves the safety characteristics of the combination tank-vlave assembly. The fuel tank 58 and housing 10 are bonded together to form one piece. The piston 20 is then engaged within the housing 10, resulting in a completely operable assembly.

A single preferred embodiment of the present invention has been disclosed and described in the drawings herein. It is to be understood, however, that various changes and modifications can be made without departing from the true scope and spirit of the present invention as set forth and defined in the following claims.

What is claimed is:

1. A piston valve comprising, in combination:

a housing having a rear face, an intake port, an exhaust port, at least one stop mounted on said housing, and a flow channel extending through the interior thereof from said intake port to said exhaust port, said flow channel defining an intake channel adjacent to said intake port and an exhaust channel adjacent to said exhaust port and in fluid communication with said intake channel, said housing further defining a piston channel having a first end and a second end, said first end adjacent to and in fluid communication with said flow channel and said second end extending through said housing forming an opening in said rear face thereof;

a piston having a butt, a bedplate at one end of said butt, a shaft extending perpendicularly from said bedplate and having a diameter less than that of said piston channel, and arms extending from said bedplate and laterally disposed on either side of said shaft, at least one of said arms having a latch on the end thereof, said piston being slidably engaged within said housing and extending therefrom through said opening in said rear face thereof, said shaft being disposed near the first end of said piston channel for sliding into said flow channel when the valve is in the off position, and said butt being disposed near the second end of said piston channel near said opening and extending therefrom, said latch on said arm and said stop on said housing defining means to limit the outward movement of said piston relative to said housing, when said latch engages said stop, and wherein the length of said shaft corresponding to the length of said arms defining means for maintaining said piston channel sealing means in sealing engagement within said piston channel when said piston has been outwardly slid to the point where said latch engages said stop;

flow channel sealing means for sealing said flow channel when said piston is slid into said flow channel when the valve is in the off position; and piston channel sealing means for sealing said piston channel.

2. A piston valve according to claim 1, in which said flow channel sealing means and said piston channel sealing means comprise O-rings mounted upon said shaft.

3. A piston valve as recited in claim 1, in which said arms are flexible, whereby said piston may be completely separated from said housing.

4. A piston valve as recited in claim 1, in which said housing and said piston are molded of plastic.

5. A piston valve as recited in claim 4, in which said housing further comprises means for heat sealing said valve to a plastic tank.

6. A piston valve as recited in claim 1, in which said shaft terminates in a conical end defining means for regulating the amount of flow permitted through said flow channel.

7. A piston valve comprising, in combination:

a housing having a rear face, an opening in said housing through said rear face, shields extending in a horizontal plane from said rear face and disposed above and below said opening defining means for protecting said opening from dirt, dust, and other particulate contamination, an intake port on an exterior surface of said housing, an exhaust port on an exterior surface of said housing, stops mounted on said housing, and a flow channel extending through the interior thereof from said intake port to said exhaust port, said flow channel defining an intake channel adjacent to said intake port and an exhaust channel adjacent to said exhaust port and in fluid communication with said intake channel, said housing further defining a piston channel having a first end and a second end, said first end adjacent to and in fluid communication with said flow channel and a second end extending through said opening in said rear face of said housing;

a piston being slidably engaged within said housing and extending therefrom through said opening in said rear face thereof, said piston having a butt, a bedplate at one end of said butt, a shaft extending perpendicularly from said bedplate and having a diameter less than that of said piston channel, said shaft further having axially aligned ribs, said shaft being disposed near the first end of said piston channel for sliding into said flow channel when the valve is in the off position, and said butt being disposed near the second end of said piston channel near said opening and extending therefrom, said piston further having flexible arms extending from said bedplate and laterally disposed on each side of said shaft, each of said arms having a latch on the end thereof defining means for limiting the outward movement of said piston relative to said housing when said latches engage said stops, and the length of said shaft corresponding to the length of said arms defining means for maintaining at least one of said O-rings in sealing engagement within said piston channel when said piston has been outwardly slid to the point where said latches engage said stops;

an O-ring mounted on said shaft for sealing said flow channel when said piston is slid into said flow channel when the valve is in the off position; and an O-ring mounted on said shaft for sealing said piston channel.

8. A piston valve as recited in claim 7, in which said housing and said piston are molded of plastic.

9. A piston valve as recited in claim 8, in which said housing further comprises means for heat sealing said valve to a plastic tank.

10. A fuel tank and piston valve assembly comprising, in combination:

a fuel tank having a valve housing bonded thereto and forming an integral part thereof;

a housing having a rear face, an intake port, an exhaust port, at least one stop mounted on said housing, and a flow channel extending through the interior thereof from said intake port to said exhaust port, said flow channel defining an intake channel adjacent to said intake port and an exhaust channel adjacent to said exhaust port and in fluid communication with said intake channel, said housing further defining a piston channel having a first end and a second end, said first end adjacent to and in fluid communication with said flow channel and said second end extending through said housing forming an opening in said rear face thereof;

a piston having a butt, a bedplate at one end of said butt, a shaft extending perpendicularly from said bedplate and having a diameter less than that of said piston channel, and arms extending from said bedplate and laterally disposed on either side of said shaft, at least one of said arms having a latch on the end thereof, said piston being slidably engaged within said housing and extending therefrom through said opening in said rear face thereof, said shaft being disposed near the first end of said piston channel for sliding into said flow channel when the valve is in the off position, and said butt being disposed near the second end of said piston channel near said opening and extending therefrom, said latch on said arm and said stop on said housing defining means to limit the outward movement of said piston relative to said housing, when said latch engages said stop, and wherein the length of said shaft corresponding to the length of said arms defining means for maintaining said piston channel sealing means in sealing engagement within said piston channel when said piston has been outwardly slid to the point where said latch engages said stop;

flow channel sealing means for sealing said flow channel when said piston is slid into flow channel when the valve is in the off position;

and piston channel sealing means for sealing said piston channel.

11. A piston valve comprising, in combination:

a housing having a rear face, an intake port, an exhaust port, and a flow channel extending through the interior thereof from said intake port to said exhaust port, said flow channel defining an intake channel adjacent to said intake port and an exhaust channel adjacent to said exhaust port and in fluid communication with said intake channel, said housing further defining a piston channel having a first end and a second end, said first end adjacent to and in fluid communication with said flow channel and said second end extending through said housing forming an opening in said rear face thereof, said housing further having shields extending in a horizontal plane from said rear face thereof and disposed above and below said opening, defining means for protecting said opening from dirt, dust, and other particulate contamination;

a piston having a butt, a bedplate at one end of said butt, and a shaft extending perpendicularly from said bedplate and having a diameter less than that of said piston channel, said piston being slidably engaged within said housing and extending therefrom through said opening in said rear face thereof, said shaft being disposed near the first end of said piston channel for sliding into said flow channel when the valve is in the off position, and said butt being disposed near the second end of said piston channel near said opening and extending therefrom said shields on said housing further defining means for maintaining axial alignment of said piston as it is slid into said housing;

flow channel sealing means for sealing said flow channel when said piston is slid into said flow channel when the valve is in the off position; and piston channel sealing means for sealing said piston channel.

12. A piston valve as recited in claim 11, in which said housing and said piston are molded of plastic.

13. A piston valve as recited in claim 12, in which said housing further comprises means for heat sealing said valve to a plastic tank.

14. A piston valve as recited in claim 11, in which said shaft terminates in a conical end defining means for regulating the amount of flow permitted through said piston channel.

* * * * *